No. 744,216. PATENTED NOV. 17, 1903.
J. A. LYONS & E. C. BROADWELL.
ELECTRICAL STORAGE CELL.
APPLICATION FILED JAN. 26, 1903.
NO MODEL.
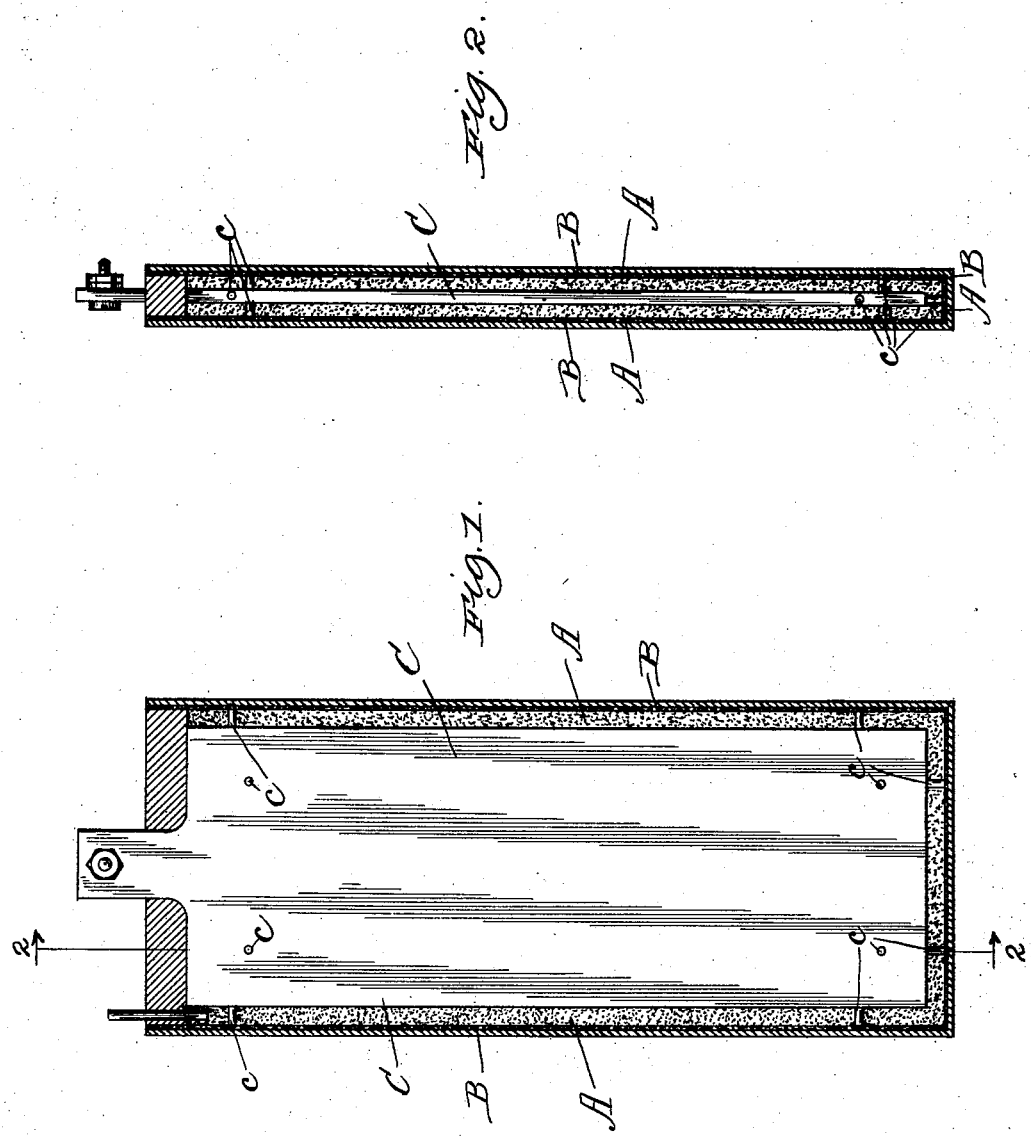

No. 744,216. Patented November 17, 1903.

UNITED STATES PATENT OFFICE.

JOHN A. LYONS AND EDWARD C. BROADWELL, OF CHICAGO, ILLINOIS.

ELECTRICAL STORAGE-CELL.

SPECIFICATION forming part of Letters Patent No. 744,216, dated November 17, 1903.

Application filed January 26, 1903. Serial No. 140,664. (No model.)

*To all whom it may concern:*

Be it known that we, JOHN A. LYONS and EDWARD C. BROADWELL, citizens of the United States, and residents of the city of Chicago, in the county of Cook and State of Illinois, have invented certain new and useful Improvements in Electrical Storage-Cells; and we do hereby declare that the following is a full, clear, and exact description of the same.

The object of the invention is to provide a light and cheap accumulator-cell, which while having a high efficiency will be of comparatively small compass and which will not deteriorate if left charged for a long period of time.

Our invention consists in the matters hereinafter described, and more fully pointed out and defined in the appended claims.

In the drawings, Figure 1 is a vertical section of the cell embodying our invention. Fig. 2 is a transverse section of the same, taken on line 2 2 of Fig. 1.

In carrying out our invention we electrolyze either a paste A, of ground or granular carbon and lead chlorid, bromid, or iodid, or a solution of the chlorids, bromids, or iodids of zinc, cadmium, cobalt, nickel, iron, tin, or copper, using any suitable electrical conductor—as, for instance, the metallic-containing jar B—as a cathode and a porous anode C, of carbon, either so cemented together as to leave it very porous throughout, or, if preferred, the said carbonaceous material can be encompassed by a suitable retaining-wall of cloth asbestos, unglazed clay, or the like, our purpose being to form a carbonaceous wick to support bromin against gravity or condense chlorin.

We take advantage of the fact that charcoal when compact is able to condense and retain within its pores about two hundred (200) times its volume or three-fourths ($\frac{3}{4}$) of its weight of chlorin gas and a larger quantity of liquid bromin.

While we are aware that it is a well-known fact that the chlorids, bromids, and iodids of the above-named metals deposit the said metals and the halogen upon the cathode and anode, respectively, upon electrolysis, there has heretofore been no effort to retain or store the halogen so eliminated, at least within the body of the anode, and, moreover, such electrolysis have been mostly operated to obtain the metals and halogens for chemical use as such or for chemical transpositions and not, to the best of our knowledge and belief, for the emplacement of the ions in such manner as to return by their recombination as kinetic energy the potentiality endowed by their disassociation by electrolysis.

In practice we prefer the haloid salts of lead, cobalt, nickel, cadmium, or zinc, since the haloid combinations of iron, tin, and copper exist in two modifications, thus interfering with the regularity of the voltage of the accumulator both in charging and discharging. In conjunction with the haloid salts of above-named metals we may add any other base acid or salt which would have a tendency to increase the conductivity of its electrolyte without interfering in any way with the mechanism of the electrolytic action, such as chlorid of calcium or sodium or their nitrates.

We claim as our invention—

1. In an electric accumulator a porous carbon anode for the retention of the halogens by capillary attraction and the property of absorption.

2. In an accumulator an electrolyte of the haloid salts of such metals as deposit reguline from their aqueous solutions by electrolysis and a porous carbon anode adapted to retain halogens by capillary attraction and the property of absorption.

3. In an electrical accumulator the combination with a cathode, of a porous carbon anode, and an electrolyte containing one or more haloid salts.

4. In an electrical accumulator the combination with a cathode, of an electrolyte containing haloid salts in conjunction with a compact paste consisting of granular carbon acting as a porous anode.

In testimony whereof we have hereunto subscribed our names in the presence of two subscribing witnesses.

JOHN A. LYONS.
EDWARD C. BROADWELL.

Witnesses:
C. W. HILLS,
WILLIE W. W. UHENBURY.